E. S. BITNER & H. A. GENTZEL.
Thrashing-Machine.
No. 218,657. Patented Aug. 19, 1879.
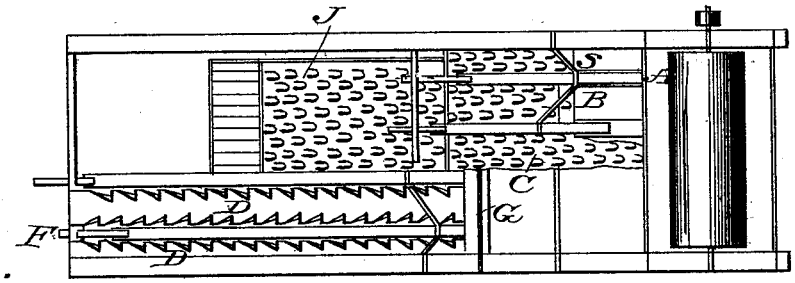
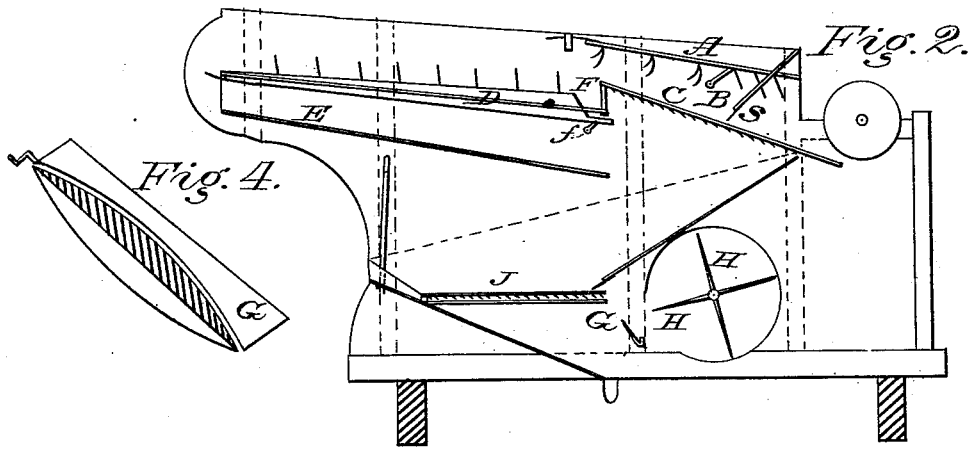
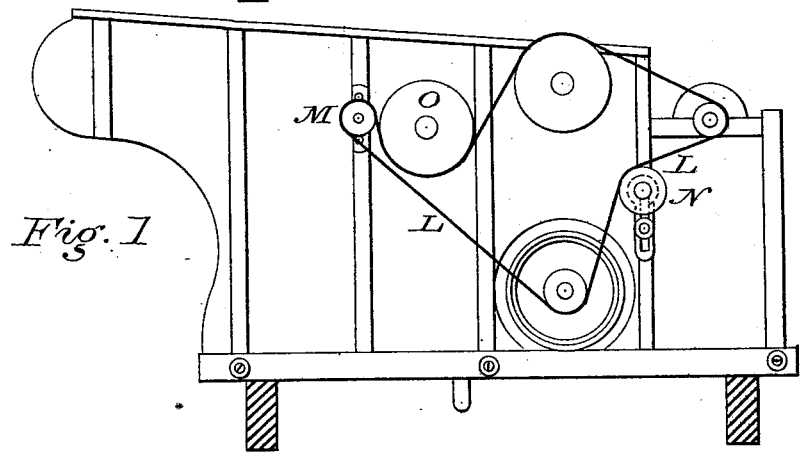
Witnesses:
W. J. Westbrook
D. P. Hanna
Inventors.
Eli S. Bitner
Henry A. Gentzel

UNITED STATES PATENT OFFICE.

ELI S. BITNER AND HENRY A. GENTZEL, OF BELLEFONTE, PENNSYLVANIA.

IMPROVEMENT IN THRASHING-MACHINES.

Specification forming part of Letters Patent No. 218,657, dated August 19, 1879; application filed February 6, 1879.

*To all whom it may concern:*

Be it known that we, ELI S. BITNER and HENRY A. GENTZEL, of Bellefonte, in the county of Centre and State of Pennsylvania, have invented certain new and useful Improvements in Grain Thrashing, Separating, and Cleaning Machines, of which the following is a specification, reference being had to the accompanying drawings, in which—

Figure 1 is a side elevation, Fig. 2 a longitudinal vertical section, and Fig. 3 a plan view, of a machine embodying our improvements.

Our improvements will first be described, and then set forth specifically in the claims.

Such parts of our machine as are old and well-known will not be particularly described.

In the rear of the thrashing-cylinder we arrange an upwardly-inclined sheet-metal bottom or floor, C, which receives the thrashed straw and grain. This floor is perforated by puncturing U-formed apertures in it, and the tongues or lips so formed are turned downward. These openings permit as much as possible of the grain to escape through upon the feed-board of the winnowing-shoe before being carried farther on.

Above the floor C work the toothed arms A, which are operated at their forward portions by the crank-shaft B, which is journaled in the sides of the machine, their rear ends being supported and sliding in a transverse bar. Just in rear of the cylinder, and in front of crank-shaft B, and supported in an inclined position, is a rack, S, to prevent the straw from wrapping around crank-shaft B, composed of pieces projecting between the toothed bars A. Each of these pieces has its lower end made of sheet metal, to give it elasticity and enable it to yield somewhat to the straw passing under it, and renders the rack capable of adjusting itself to the varying quantities of straw passing under it. After the straw has passed the rack S the bars A conduct it up over the incline C, loosening it out and facilitating the escape of the grain. The straw is conducted upon a perforated floor, D, composed of racks or bars arranged with spaces between them, and faced on top with sheet metal, and notched at the sides to form openings, which permit the remaining grain to drop through, while preventing the straw from doing the same.

Working in the spaces between bars D are the toothed bars or rakes F, supported at the inner ends on a crank-shaft, $f$, journaled below the floor D. The bars F are broader vertically at the front end, and the cranks are of such a length that the upper faces of the arms F never sink below the plane of the surface of the floor D. This prevents the downward escape of any of the straw. The outer ends of the rakes F slide in a bar, like the ends of toothed bars A. The grain drops through upon chute E and is delivered to the winnowing-shoe.

H is the fan in its case. J is the chaffing-sieve. It is made of sheet metal, with U-formed perforations, forming tongues, which, when bent down in an inclined position, direct the blast from the fan up through the openings, for freeing the grain from chaff.

G is the wind-board, which, in order to divide and direct the current of air against the chaffer J, is made higher or thicker in the middle, thus compensating the tendency of the blast to be stronger in the middle than at the sides. It is rendered movable by being mounted on a crank and journaled in the sides of the incline.

The different parts are all run from the thrashing-cylinder by means of belt L, which passes around the pulleys on the cylinder-shaft, the crank-shaft B, and the fan-shaft, and under pulley O. By the use of an idle-pulley, M, the necessity of crossing the belt is obviated. The belt is tightened by means of adjustable pulley N.

We disclaim the broad idea of arranging the toothed bars F so that their teeth simply do not descend below the plane of the floor D. Our invention is limited to the specific arrangement of the parts whereby the upper faces of the oscillating bars F never descend below the plane of the upper surface of the floor D, for the purpose of preventing the escape of the straw through the floor D along with the grain, or the jamming of the straw between the bars F and the bars of floor D.

Having described our invention, what we claim as new is—

1. The combination, with the rake-bars A and the floor, of the rack S, having its component pieces formed at their lower ends of sheet metal or other suitable elastic material, substantially as set forth.

2. The combination of the floor D and the toothed bars working through it, said bars being mounted in cranks, and so arranged that their upper faces never sink below the plane of the floor D, substantially as set forth.

3. The combination, with fan H, of deflector G, formed with a raised or thickened middle portion, substantially as set forth.

ELI S. BITNER.
HENRY A. GENTZEL.

Witnesses:
W. J. WESTBROOK,
D. P. HANNA.